(12) United States Patent
Lee

(10) Patent No.: US 6,504,340 B1
(45) Date of Patent: Jan. 7, 2003

(54) HANDS-FREE KIT FOR MOBILE PHONES USING SOLAR CELL

(75) Inventor: Sea Sun Lee, 437-14 Simgok 1-dong wommi-gu, Boochun-shi, Kyunggi-do, 420-010 (KR)

(73) Assignee: Sea Sun Lee, Boochun-shi (KR)

( * ) Notice: Subject to any disclaimer, the term of this patent is extended or adjusted under 35 U.S.C. 154(b) by 0 days.

(21) Appl. No.: 10/160,010

(22) Filed: Jun. 4, 2002

(30) Foreign Application Priority Data

Mar. 8, 2002 (KR) .......................................... 02-12338

(51) Int. Cl.[7] .............................................. H01M 10/46
(52) U.S. Cl. ........................................ 320/101; 320/140
(58) Field of Search ................................. 320/101, 137, 320/140, 116; 323/906; 136/243, 291, 293

(56) References Cited

U.S. PATENT DOCUMENTS 6,028,327 A * 2/2000 Mizoguchi et al. ............ 257/98
6,429,621 B1 * 8/2002 Arai ............................ 320/101

* cited by examiner

Primary Examiner—Edward H. Tso
Assistant Examiner—Lawrence Luk
(74) Attorney, Agent, or Firm—Staas & Halsey LLP

(57) ABSTRACT

Disclosed herein is a hands-free kit for mobile phones using a solar cell. The hands-free kit has a solar cell, a charging unit, and a power switch. The solar cell is formed to be integrated with the body at a portion of the body of the hands-free kit and used to convert sunlight into electrical energy. The charging unit is formed at a portion within the body of the hands-free kit for charging one or more rechargeable batteries of the charging unit by power supplied from the solar cell. The power switch is formed at a portion of the body of the hands-free kit for allowing the rechargeable batteries to be connected in parallel with the solar cell and charged when the power switch is turned off, while allowing the rechargeable batteries to be connected in series with each other so as to convert a charged voltage into power for operating an internal circuit of the hands-free kit when the power switch is turned on.

6 Claims, 5 Drawing Sheets

HANDS-FREE KIT FOR MOBILE PHONES USING SOLAR CELL

BACKGROUND OF THE INVENTION

1. Field of the Invention

The present invention relates generally to a hands-free kit for mobile phones using a solar cell, and more particularly to a hands-free kit for mobile phones using a solar cell, which can convert sunlight into electrical energy and use the electrical energy.

2. Description of the Prior Art

In a conventional hands-free kit for mobile phones using a solar cell, the intensity of power supplied from the solar cell is low. Therefore, high-intensity power can be produced only by broadening the surface area of the solar cell for receiving sunlight. Consequently, there occurs a problem that the installation area of the hands-free kit within a car must be broadened.

Meanwhile, in the conventional hands-free kit, a connection plug electrically connected to an opposite end of an ear jack plug used for a mobile phone, and a connection jack into which the connection plug is inserted are fabricated to confirm to the specifications of a three-electrode plug or four-electrode plug established according to countries. Therefore, the conventional hands-free kit is problematic in that a connection plug and a connection jack of standardized specifications cannot be used due to difference of kinds of plugs and jacks according to countries, such that a connection plug and a connection jack cannot be compatible with other such plugs and jacks.

Further, the conventional hands-free kit is problematic in that a "send" button and a power switch are separately arranged on the hands-free kit. Therefore, when the mobile phone is connected to the hands-free kit and used, a user must press the power switch and then the send button, thus resulting in inconvenience of causing the user to manipulate buttons several times.

SUMMARY OF THE INVENTION

Accordingly, the present invention has been made keeping in mind the above problems occurring in the prior art, and an object of the present invention is to provide a hands-free kit for mobile phones, which can reduce an area occupied by the hands-free kit while utilizing a solar cell generally used to receive sunlight, by reducing the surface area of the solar cell by more than half.

Another object of the present invention is to provide a hands-free kit for mobile phones, which can combinedly use both a three-electrode plug and a four-electrode plug.

A further object of the present invention is to provide a hands-free kit for mobile phones, which can enable the supply of power and conversion to a talk mode simultaneously by manipulating a switch only one time.

In order to accomplish the above object, the present invention provides a hands-free kit for mobile phones using a solar cell, the hands-free kit being used by inserting a mobile phone connection plug inserted into a connection jack formed at a portion of a body of the hands-free kit, comprising a solar cell formed to be integrated with the body at a portion of the body of the hands-free kit and used to convert sunlight into electrical energy; a charging unit formed at a portion within the body of the hands-free kit for charging one or more rechargeable batteries of the charging unit by power supplied from the solar cell when the rechargeable batteries are electrically connected in parallel with the solar cell; and a power switch formed at a portion of the body of the hands-free kit for allowing the rechargeable batteries to be connected in parallel with the solar cell and charged when the power switch is turned off, while allowing the rechargeable batteries to be connected in series with each other so as to convert a charged voltage into power for operating an internal circuit of the hands-free kit when the power switch is turned on.

The hands-free kit further comprises a first direct current (DC)/DC converter unit for converting the charged voltage into the power for operating the internal circuit of the hands-free kit by a switching operation of the power switch.

Further, the connection jack into which the mobile phone connection plug is inserted is a combined connection jack for enabling a three-electrode plug and a four-electrode plug to be combinedly used.

The hands-free kit further comprises a three-electrode plug short switch for allowing the charged voltage of the charging unit to be supplied to the internal circuit of the hands-free kit, and allowing a ground terminal and a microphone terminal of the three-electrode plug to be electrically shorted when the power switch is pressed and turned on; a four-electrode plug short switch for allowing two ground terminals of the fourth-electrode plug to be electrically shorted when the power switch is pressed and turned on; and an external cap for covering the power switch, wherein the three-electrode plug short switch and the four-electrode plug short switch are formed at a portion under the external cap of the power switch, thus enabling the three-electrode and the four-electrode plug short switches to be simultaneously pressed when the power switch is pressed.

The hands-free kit further comprises a second DC/DC converter unit for converting power supplied from a lighter jack plug for cars into a voltage for charging the charging unit; and an external power selection switch for supplying the voltage of the second DC/DC converter unit to the charging unit and charging the rechargeable batteries of the charging unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
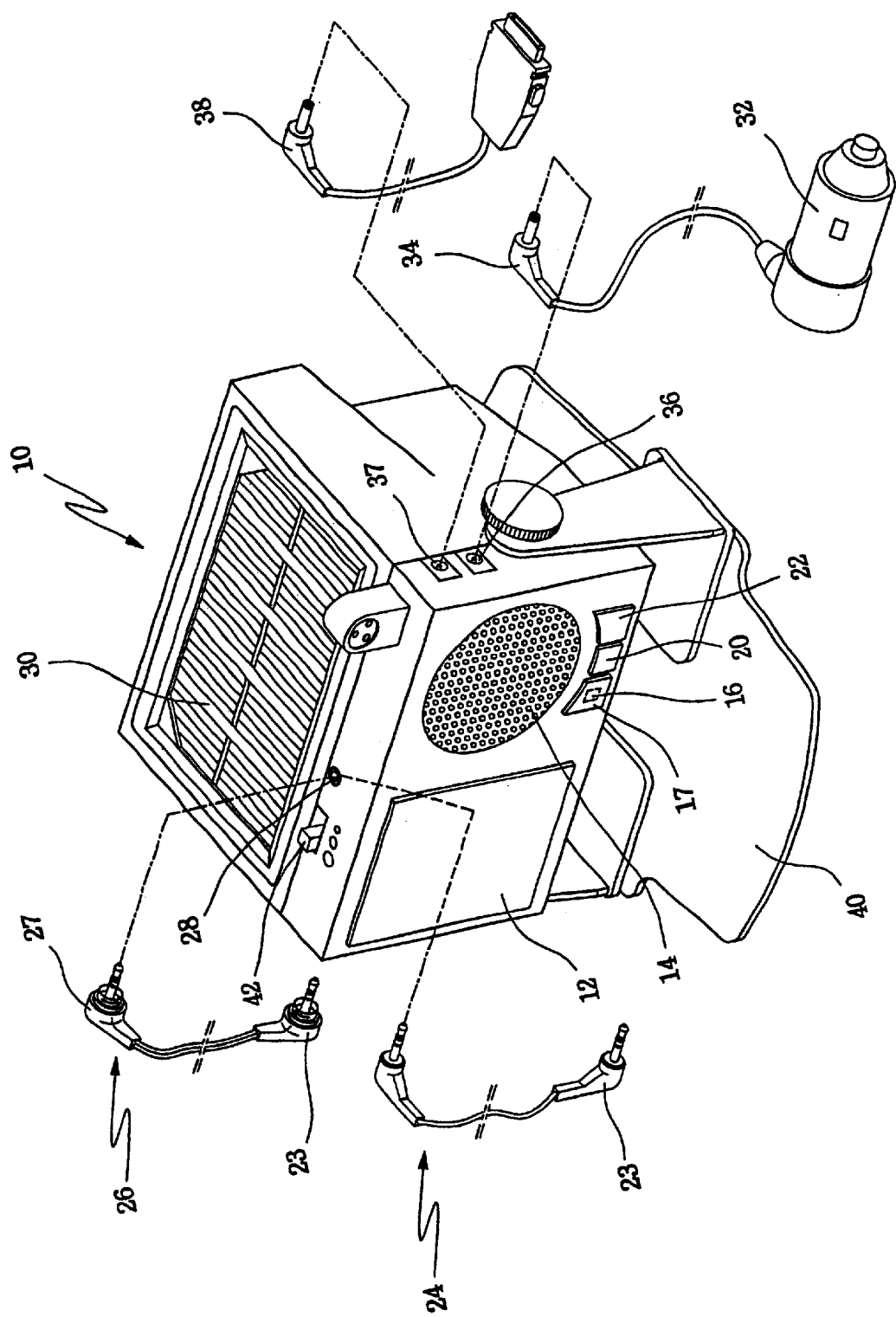
FIG. 1 is a perspective view of a hands-free kit for mobile phones using a solar cell according to a preferred embodiment of the present invention.
Figure 2:
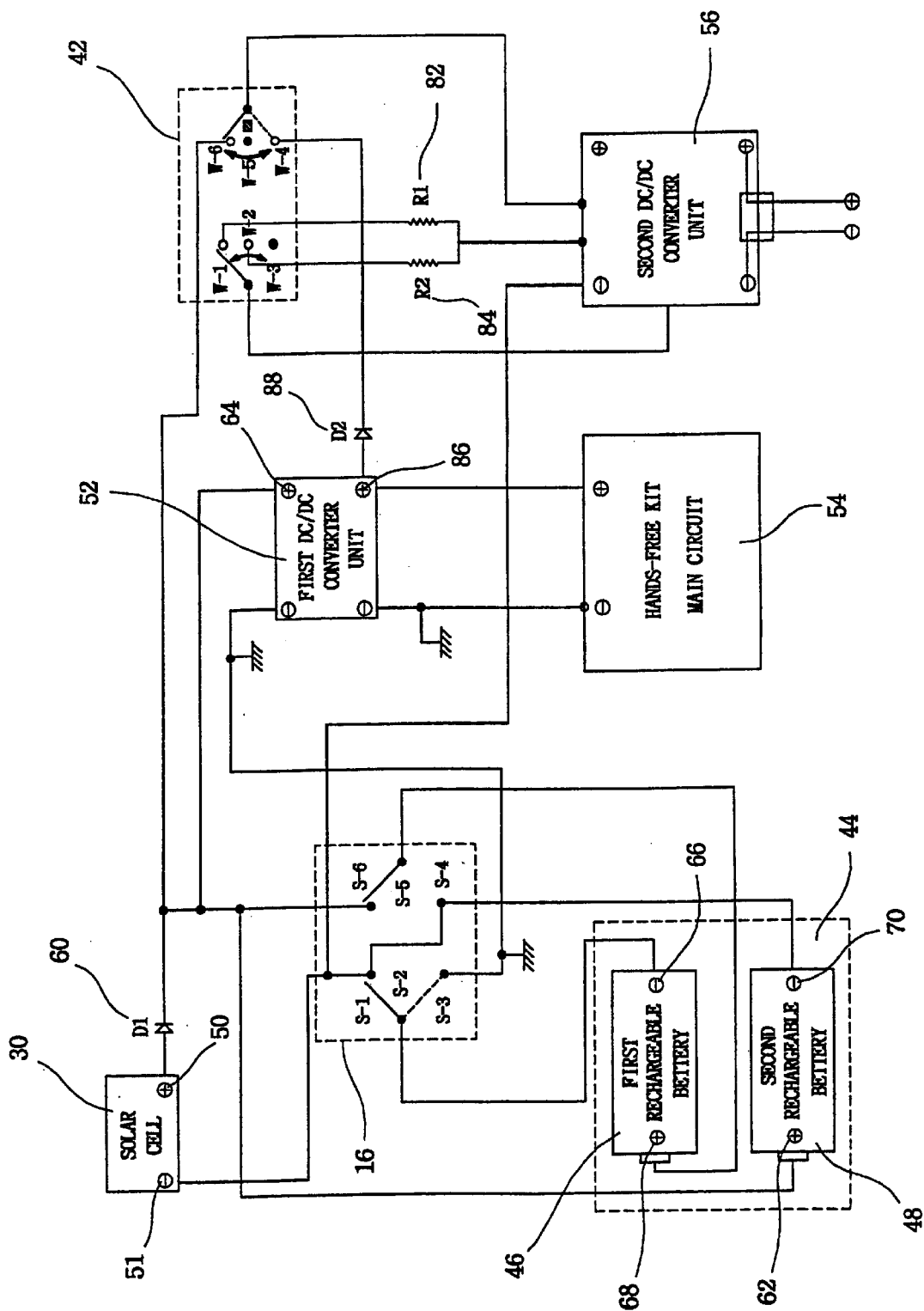
FIG. 2 is a circuit diagram of the hands-free kit according to the present invention.
Figure 3:
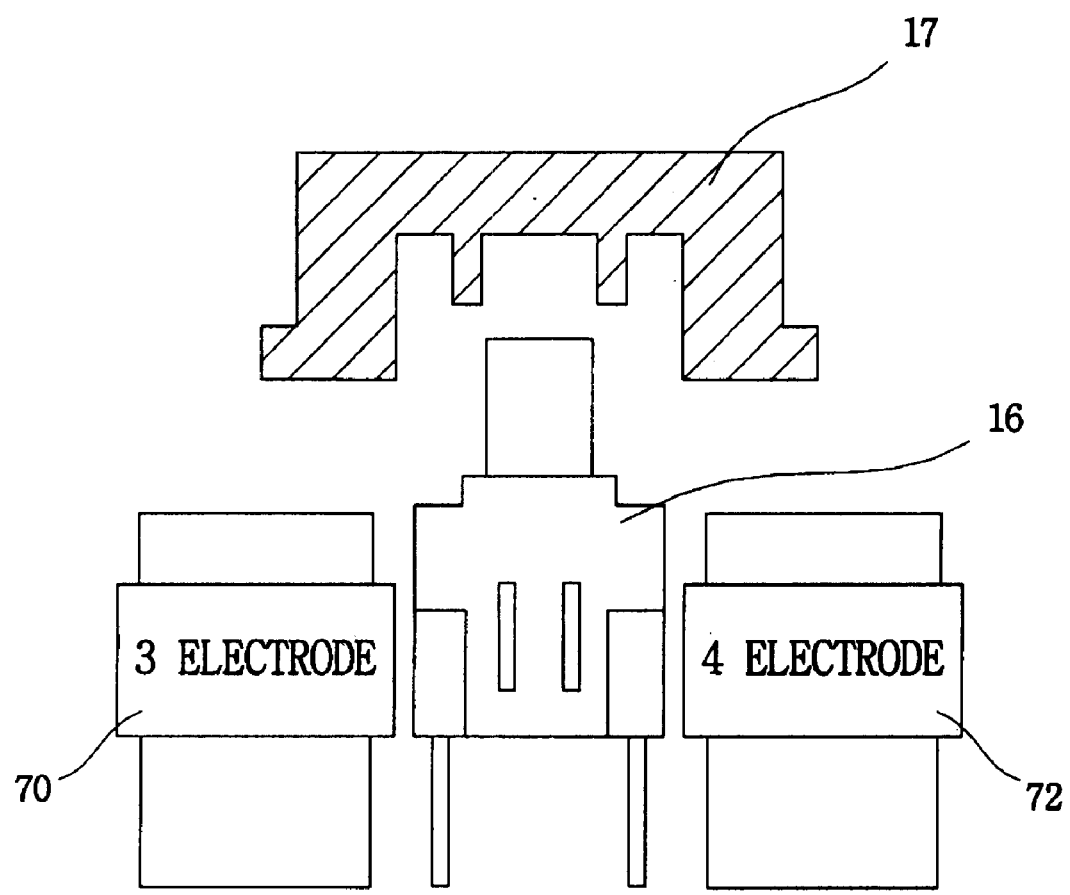
FIG. 3 is a view showing the construction of an external cap of a power switch according to the present invention.
Figure 4:
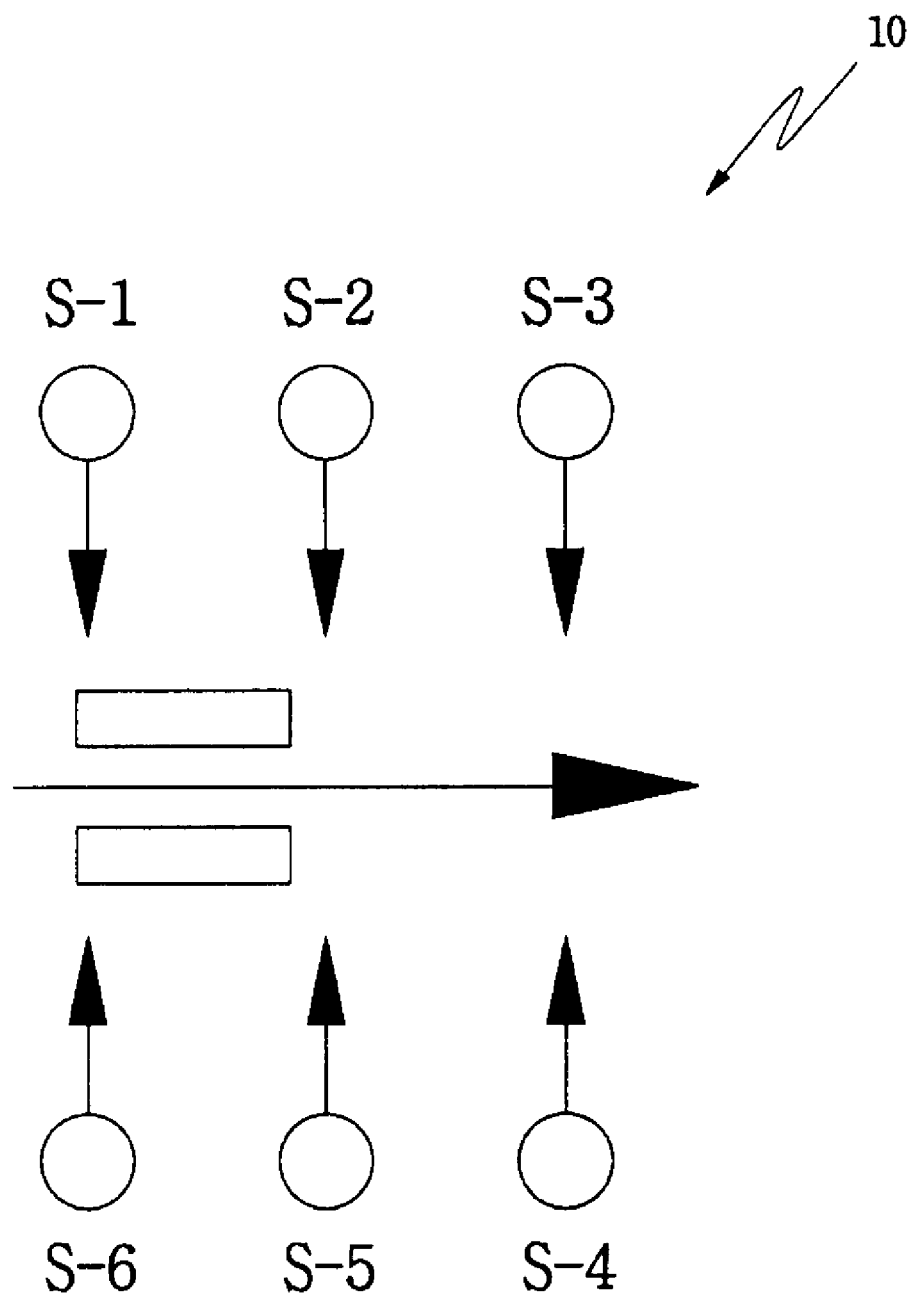
FIG. 4 is a block diagram of the power switch describing its operations in detail according to the present invention.
Figure 5A:
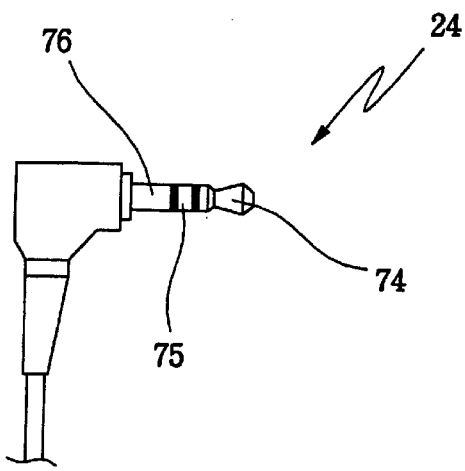
FIG. 5A is a view showing a three-electrode plug connected to a mobile phone connection plug inserted into a connection jack of the hands-free kit of FIG. 1.
Figure 5B:
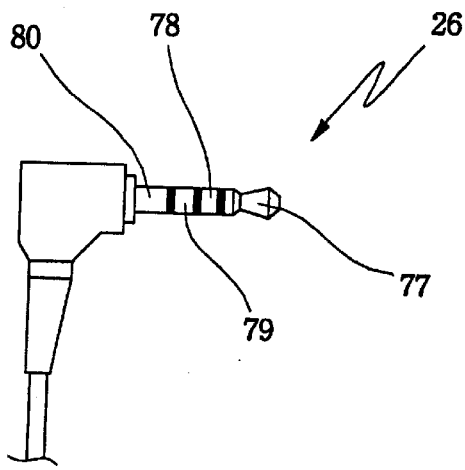
FIG. 5B is a view showing a typical four-electrode plug connected to a mobile phone connection plug inserted into the connection jack of the hands-free kit of FIG. 1.
Figure 5C:
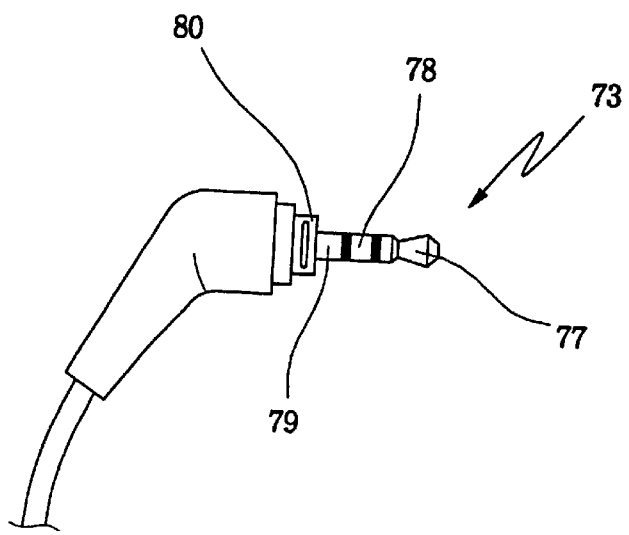
FIG. 5C is a view showing a cap-type four-electrode plug connected to a mobile phone connection plug inserted into a connection jack of the hands-free kit of FIG. 1.

FIG. 1 is a perspective view of a hands-free kit for mobile phones using a solar cell according to a preferred embodiment of the present invention, and FIG. 2 is a circuit diagram of the hands-free kit according to the present invention. FIG. 3 is a view showing the construction of an external cap of a power switch according to the present invention, and FIG. 4 is a block diagram of the power switch describing its operations in detail according to the present invention. FIG. 5A is a view showing a three-electrode plug connected to a mobile phone connection plug inserted into a connection jack of the hands-free kit of FIG. 1, FIG. 5B is a view showing a typical four-electrode plug connected to a mobile phone connection plug inserted into the connection jack of the hands-free kit of FIG. 1, and FIG. 5C is a view showing a cap-type four-electrode plug connected to a mobile phone connection plug inserted into a connection jack of the hands-free kit of FIG. 1.

Referring to FIG. 1, a mobile phone placing unit 12, to which a magnet is attached so as to stick a mobile phone to the mobile phone placing unit 12, is formed at a portion on the front surface of a body of the hands-free kit 10. Further, a speaker 14 to output voice of a calling party to the outside during a call by the mobile phone is formed at another portion of the front surface of the hands-free kit 10. There are formed at a lower portion on the front surface of the hands-free kit 10 an external cap 18 of a power switch 16, a talk mode conversion switch 20, and a volume control switch 22. The power switch 16 performs functions of controlling the supply of power, conversion to a talk mode, and call connection so as to enable communication with a calling party and conversion of operations of the hands-free kit 10. The talk mode conversion switch 20 is used to switch a talk mode into a privacy mode for private conversation. The volume control switch 22 is used to control sound volume of the speaker 14.

Further, a mobile phone connection jack 28 is formed at a portion on the top surface of a body of the hands-free kit 10 to allow a connection plug, such as a three-electrode plug 24 or a four-electrode plug 26 connected to the mobile phone, to be fixedly inserted into the jack 28. A solar cell 30 to receive sunlight and convert the sunlight into electrical energy is formed on the top surface of the body of the hands-free kit 10. Further, a connection socket 36 and a charger jack plug connection socket 37 are formed on a side surface adjacent to the top surface on which the mobile phone connection jack 28 is formed. In this case, the connection socket 36 is formed such that a lighter jack plug connector 34, to which a lighter jack plug 32 for cars or an adaptor for external power supply can be connected, is inserted into the socket 36. The charger jack plug connection socket 37 is formed such that a mobile phone charger jack plug 38 for charging the mobile phone is inserted into the charger jack plug connection socket 37.

Further, a base 40 having a bottom surface applied with an adhesive is formed under the body of the hands-free kit 10 such that the hands-free kit 10 can be attached to a portion of an instrument panel of a car.

Moreover, an external power selection switch 42 functioning as a function key for selecting whether external power is supplied is formed at a portion on the top surface of the body of the hands-free kit 10.

Hereinafter, the hands-free kit of the present invention is described in detail with reference to FIGS. 1 to 4.

The solar cell 30 uses a single crystal silicon cell with a reference voltage of 2.5 V±0.6 V at 200 mA under good sunlight conditions. The single crystal silicon cell generates a voltage of about 2.5 V, which is too small to be used as a voltage for operating an internal circuit of the hands-free kit 10. Therefore, if the hands-free kit 10 is not used, a voltage obtained by the solar cell 30 is used to charge first and second rechargeable batteries 46 and 48 of a charging unit 44. The charging unit 44 is electrically connected to the solar cell 30 through the power switch 16.

The first and second rechargeable batteries 46 and 48 are respectively charged to 1.2 V, and a maximal input voltage thereof is 1.4 V to 1.5 V.

As described above, both the first and second rechargeable batteries 46 and 48 are connected in parallel with the solar cell 30 between positive and negative terminals 50 and 51 of the solar cell 30 and respectively charged, when the power switch 16 is not operated. When the power switch 16 is operated, the first and second rechargeable batteries 46 and 48 are connected in series with each other, so an output voltage of 2.4 V of the charging unit 44 is inputted to a first direct current (DC)/DC converter unit 52.

The first DC/DC converter unit 52 converts the inputted voltage of 2.4 V into 10.9 V, and outputs the converted voltage to a main circuit 54 of the hands-free kit 10 as a voltage for operating the main circuit 54. The voltage of 10.9 V is used as power for driving the mobile phone connection jack 28 of the mobile phone connection plug 27 and the speaker 14 arranged on the hands-free kit 10.

The first DC/DC converter unit 52 can output various voltages of 5 to 25 V through its output terminal.

Further, the first DC/DC converter unit 52 also outputs a voltage of 4.2 V, which is a mobile phone charging voltage, thus enabling a battery of the mobile phone to be charged.

A second DC/DC converter unit 56 is arranged so as to convert battery voltage of DC 12 V supplied through the lighter jack plug 32, or DC voltage of 12 to 24 V suppliable through an adaptor for external power supply into power usable by the hands-free kit 10. Therefore, the second DC/DC converter unit 56 allows the charging unit 44 and the mobile phone to be rapidly charged using external power.

The voltage charged by the charging unit 44 using the solar cell 30, and the voltage supplied through the adaptor for external power supply and the lighter jack plug 32 can be selected by the operation of the external power selection switch 42.

Hereinafter, a process of converting a voltage, which is charged by the charging unit 44 using power supplied from the solar cell 30, to be supplied to the main circuit 54 of the hands-free kit 10 is described in detail.

A positive terminal 50 of the solar cell 30 which generates the voltage of 2.5 V using sunlight is connected to a sixth terminal S-6 of the power switch 16, a positive terminal 62 of the second rechargeable battery 48, and a positive input terminal 64 of the first DC/DC converter unit 52, through a diode (D1) 60 to flow current in a single direction. Further, a negative terminal 51 of the solar cell 30 is connected to a first terminal S-1 of the power switch 16. A second terminal S-2 of the power switch 16 is connected to a negative terminal 66 of the first rechargeable battery 46. A positive terminal 68 of the first rechargeable battery 46 is connected to a fifth terminal S-5 of the power switch 16. A negative terminal 70 of the second rechargeable battery 48 is connected to a fourth terminal S-4 of the power switch 16. The first and fourth terminals S-1 and S-4 of the power switch 16 are shorted.

The power switch 16 is realized as a push button switch. If the power switch 16 is internally turned off, the first and second terminals S-1 and S-2 are internally connected to each other, and the sixth and fifth terminals S-6 and S-5 are internally connected to each other. If the power switch 16 as a push button switch is pressed, the power switch 16 is turned on, so the second and third terminals S-2 and S-3 are internally connected to each other, and the fourth and fifth terminals S-4 and S-5 are internally connected to each other.

According to the above construction, the solar cell 30 is constructed such that it is connected in parallel with the first and second rechargeable batteries 46 and 48 of the charging unit 44 to charge the first and second rechargeable batteries 46 and 48. That is, the solar cell 30 is connected such that its output voltage of 2.5 V directly charges the first and second rechargeable batteries 46 and 48 when the power switch 16 is turned off.

Further, the power switch 16 is connected to the mobile phone connection plug 27, such as the three-electrode plug 24 or the four-electrode plug 26 electrically connected to an opposite end of the ear jack plug 23 inserted into the mobile phone. If the power switch 16 is pressed, the second and third terminals S-2 and S-3 are internally connected to each other, and the fourth and fifth terminals S-4 and S-5 are internally connected, similarly to the above case. Therefore, the positive terminal 68 of the first rechargeable battery 46 is electrically connected to the negative terminal 70 of the second rechargeable battery 48. Further, the negative terminal 66 of the first rechargeable battery 46 and the positive terminal 62 of the second rechargeable battery 48 are connected to input terminals of the first DC/DC converter unit 52. Therefore, the first and second rechargeable batteries 46 and 48 are switched to be connected in series with each other. As described above, if the hands-free kit 10 is used, a voltage at the positive terminal 50 of the solar cell 30 is dropped by about 1 V. However, the remaining voltage of 1.5 V is continuously supplied to the second rechargeable battery 48.

Meanwhile, the external cap 17 covering the power switch 16 is formed so as to allow a user to conveniently press the power switch 16. At this time, the external cap 17 is designed to be larger than a size sufficient to cover the top surface of the power switch 16. Therefore, a three-electrode plug short switch 70 and a four-electrode plug short switch 72 can be disposed under the external cap 17. In this case, the three-electrode plug short switch 70 and the four-electrode plug short switch 72 serve to switch a talk mode to a mode using the three-electrode plug 24 or the four-electrode plug 26 inserted to the mobile phone connection jack 28. In this case, the mobile phone connection jack 28 constitutes a part of the main circuit 54 and is a combined connection jack. That is, the power switch 16, the three-electrode plug short switch 70 and fourth-electrode plug short switch 72 are disposed together under the external cap 17. Therefore, if the user presses the external cap 17, the power switch 16, the three-electrode plug short switch 70 and the fourth-electrode plug short switch 72 are simultaneously pressed.

Both the three-electrode and fourth-electrode plug short switches 70 and 72 are simple contact switches, so they are turned on if they are pressed once, and turned off if pressed once again.

As shown in FIG. 5A, on the three-electrode plug 24 formed at an opposite end of the ear jack plug 23 inserted into the mobile phone, a microphone terminal 74, an audio terminal 75 and a ground terminal 75 are formed. In this case, if the ground terminal 76 and the microphone terminal 74 are shorted, the mobile phone is switched to a talk mode.

The function of switching to a talk mode can be selected according to functions of the mobile phone.

As shown in FIG. 5B, on the four-electrode plug 26, a microphone terminal 77, an audio terminal 78, a first ground terminal 79 and a second ground terminal 80 are formed. In this case, if the first and second ground terminals 79 and 80 are shorted, the mobile phone is switched to a talk mode.

Referring to FIG. 5C, a cap-type plug 73, which is a kind of four-electrode plug 26, has the same function as that of the four-electrode plug 26.

Preferably, the same plug as the connection plug 27 is used as the ear jack plug 23.

Hereinafter, exemplary operations of charging the charging unit 44 by external power and supplying the external power to the main circuit 54 of the hands-free kit 10 after the external power is supplied are described in detail.

The power of 12 to 24 V supplied through the lighter jack plug 32 for cars or an external adaptor is converted into power for driving the circuit by the second DC/DC converter unit 56. In this case, whether the external power is supplied can be selected by manipulating the external power selection switch 42. This selection method is slightly different from that of the power switch 16. The external power selection switch 42 can be used to select three modes. First, if a first terminal W-1 of the external power selection switch 42 is selected, the first terminal W-1 is connected to the second DC/DC converter unit 56 through a first resistor (R1) 82 so as to drop a voltage to 2.4 V. Further, a sixth terminal W-6 selected simultaneously with the first terminal W-1 of the external power selection switch 42 is connected to the charging unit 44, thus enabling the voltage of 2.4 V to be supplied to the charging unit 44 through the sixth terminal W-6 to charge the charging unit 44.

Further, if a second terminal W-2 is selected, the voltage of the second DC/DC converter unit 56 is dropped to 4.2 V through a resistor (R2) 84, thus enabling the mobile phone to be charged by the voltage of 4.2 V.

On the other hand, if a third terminal W-3 of the external power selection switch 42 is selected, a fourth terminal W-4 is selected simultaneously with the third terminal W-3 even though the third terminal W-3 is opened. Therefore, voltage supplied from the positive output terminal 86 of the first DC/DC converter unit 52 through a diode (D2) 88 is used to charge the mobile phone.

As described above, the present invention provides a hands-free kit using a solar cell, which can reduce installation area of the hands-free kit installed within a car by remarkably reducing the surface area of a solar cell integrated with the hands-free kit.

Further, the present invention provides a hands-free kit, in which a jack for a combined use of a three-electrode plug and a four-electrode plug is formed at a portion of a body of the hands-free kit, thus allowing a user to immediately use a mobile phone connection plug, without checking whether the mobile phone connection plug, which is variable according to countries or kinds of mobile phones, is a three-electrode plug or a four-electrode plug.

Further, the present invention provides a hands-free kit, which can switch a mobile phone to a talk mode by manipulating a switch of the hands-free kit only one time, thus increasing user's convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hands-free kit for mobile phones using a solar cell, the hands-free kit being used by inserting a mobile phone connection plug inserted into a connection jack formed at a portion of a body of the hands-free kit, comprising:

a solar cell formed to be integrated with the body at a portion of the body of the hands-free kit and used to convert sunlight into electrical energy;

a charging unit formed at a portion within the body of the hands-free kit for charging one or more rechargeable batteries of the charging unit by power supplied from the solar cell when the rechargeable batteries are electrically connected in parallel with the solar cell; and a power switch formed at a portion of the body of the hands-free kit for allowing the rechargeable batteries to be connected in parallel with the solar cell and charged when the power switch is turned off, while allowing the rechargeable batteries to be connected in series with each other so as to convert a charged voltage into power for operating an internal circuit of the hands-free kit when the power switch is turned on.

2. The hands-free kit for mobile phones using a solar cell according to claim 1, further comprising a first direct current (DC)/DC converter unit for converting the charged voltage into the power for operating the internal circuit of the hands-free kit by a switching operation of the power switch.

3. The hands-free kit for mobile phones using a solar cell according to claim 1, wherein the connection jack into which the mobile phone connection plug is inserted is a combined connection jack for enabling a three-electrode plug and a four-electrode plug to be combinedly used.

4. The hands-free kit for mobile phones using a solar cell according to claim 3, further comprising:

a three-electrode plug short switch for allowing the charged voltage of the charging unit to be supplied to the internal circuit of the hands-free kit, and allowing a ground terminal and a microphone terminal of the three-electrode plug to be electrically shorted when the power switch is pressed and turned on;

a four-electrode plug short switch for allowing two ground terminals of the fourth-electrode plug to be electrically shorted when the power switch is pressed and turned on; and an external cap for covering the power switch, wherein the three-electrode plug short switch and the four-electrode plug short switch are formed at a portion under the external cap of the power switch, thus enabling the three-electrode and the four-electrode plug short switches to be simultaneously pressed when the power switch is pressed.

5. The hands-free kit for mobile phones using a solar cell according to claim 1, further comprising:

a three-electrode plug short switch for allowing the charged voltage of the charging unit to be supplied to the internal circuit of the hands-free kit, and allowing a ground terminal and a microphone terminal of the three-electrode plug to be electrically shorted when the power switch is pressed and turned on;

a four-electrode plug short switch for allowing two ground terminals of the fourth-electrode plug to be electrically shorted when the power switch is pressed and turned on; and an external cap for covering the power switch, wherein the three-electrode plug short switch and the four-electrode plug short switch are formed at a portion under the external cap of the power switch, thus enabling the three-electrode and the four-electrode plug short switches to be simultaneously pressed when the power switch is pressed.

6. The hands-free kit for mobile phones using a solar cell according to claim 1, further comprising:

a second DC/DC converter unit for converting power supplied from a lighter jack plug for cars into a voltage for charging the charging unit; and an external power selection switch for supplying the voltage of the second DC/DC converter unit to the charging unit and charging the rechargeable batteries of the charging unit.

* * * * *

UNITED STATES PATENT AND TRADEMARK OFFICE
CERTIFICATE OF CORRECTION

PATENT NO.     : 6,504,340 B1
DATED          : January 7, 2003
INVENTOR(S)    : Sea Sun Lee It is certified that error appears in the above-identified patent and that said Letters Patent is hereby corrected as shown below:

<u>Title page,</u>
Item [73], Assignee, delete "Sea Sun Lee, Boochun-shi (KR)"; and insert
-- Doo Young Electronics Co., Ltd., 872-2, Hogye-dong, Dongan-gu, Anyang-shi, Kyuggi-do, Republic of Korea --.

Signed and Sealed this

Sixteenth Day of September, 2003

JAMES E. ROGAN
*Director of the United States Patent and Trademark Office*